Feb. 20, 1951 F. E. CARLSON 2,542,311
PHOTOGRAPHIC SPOTLIGHT HAVING A FLASHTUBE
AND A MODELING LAMP
Filed July 6, 1946
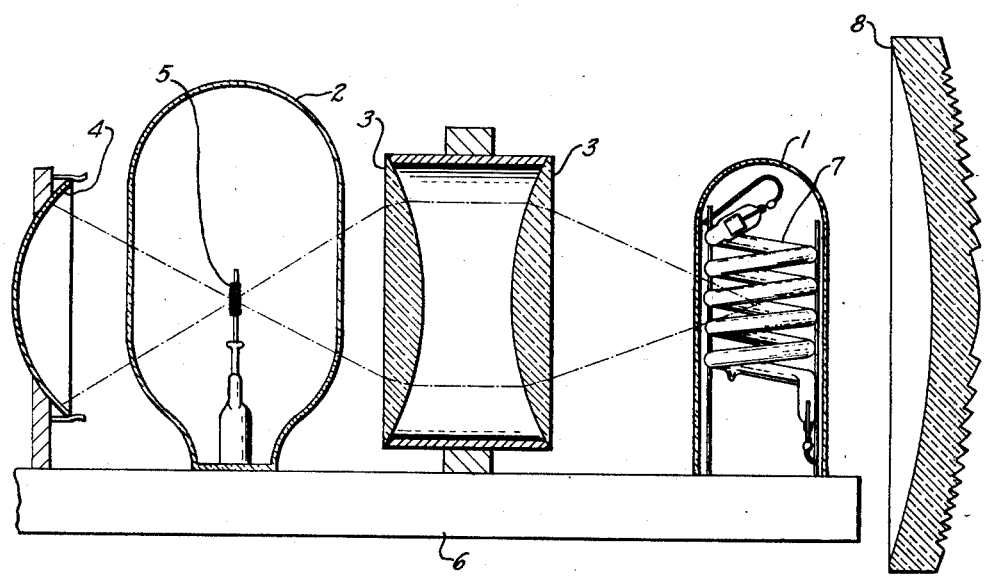
INVENTOR:
FRANK E. CARLSON,
BY John H Anderson
HIS ATTORNEY Patented Feb. 20, 1951

2,542,311

UNITED STATES PATENT OFFICE 2,542,311

PHOTOGRAPHIC SPOTLIGHT HAVING A FLASH TUBE AND A MODELING LAMP

Frank E. Carlson, Cleveland Heights, Ohio, assignor to General Electric Company, a corporation of New York Application July 6, 1946, Serial No. 681,659

5 Claims. (Cl. 240—1.3)

My invention relates to light sources and light projecting systems particularly useful in photography.

Lamps emitting a brilliant flash of actinic radiation and comprising a helically coiled tubular envelope for enclosing a luminous electric discharge are coming into extensive use for taking photographs. Such lamps are known as flashtubes. The photographer must pose his subject and focus his camera before taking the flashlight picture and a lamp emitting a less brilliant but continuous light, such as an incandescent lamp, is usually employed for furnishing illumination for these purposes before the picture is taken. These lamps are known as modeling lamps. Lamp units including both types of lamps with the filament of the incandescent lamp mounted in the axis of the helix so that the lamps have virtually the same light center have been used successfully for the general or flood lighting of scenes to be photographed. By so mounting the different size luminous elements of the lamps the illumination from the two sources has approximately the same distribution.

The above described arrangement of the luminous elements of the lamps does not lend itself as satisfactorily to spotlighting as it does to flood lighting because the different size luminous elements produce a greater difference in the candlepower distributions and the spreads of the beams projected from such spotlights. Thus, it is difficult for the photographer to judge where the highlights and shadows will appear in the photograph.

The principal object of my invention is to provide spotlighting equipment for photography comprising a flashtube and a modeling lamp in which the beams produced by the two sources have approximately the same candlepower distribution and spread. Another object of my invention is to provide such spotlighting equipment capable of producing various lighting effects. Further objects and advantages of the invention will appear from the following detailed description of a species thereof and from the appended claims.

In the drawing accompanying and forming part of the specification an embodiment of my invention is shown in a fragmentary, side-elevational, partly sectional view.

Referring to the drawing the spotlight comprises a flashtube 1 and an incandescent lamp 2. Condenser lenses 3 are interposed between the two light sources and a spherical mirror 4 is mounted in back of the incandescent lamp to reflect incident light back toward the filament 5 to increase the light traveling toward the lenses 3. The latter form an image of the incandescent filament 5 and the light sources 1 and 2 are so arranged with respect to the lenses 3 on support 6 that the image would normally appear at the axis of the helically coiled, tubular vitreous envelope 7 of the flashtube 1. However, the image is sufficiently dispersed by the tubular envelope 7, which is usually of glass or quartz, that substantially the entire envelope 7 is luminous at an intensity such that a continuous beam acceptable for focusing the spotlight on the subject can be formed by the Fresnel lens 8 of the spotlight. Since the helical envelope 7 serves as the light source during focusing and defines the path of the luminous electric discharge when the flashtube is ignited the continuous beam projected for focusing corresponds much more closely to the flash beam than when the conventional arrangement of a lamp mounted within the coils of the envelope 7 with its filament at the axis of the helix is used. In the latter arrangement the filament serves as the light source and because of its smaller size it produces a beam greatly different in spread and in candlepower distribution than that produced by the flashtube 1.

The flashtube 1, the incandescent lamp 2, the condenser lenses 3 and the spherical mirror 4 are fixedly mounted on the common support 6. The latter may be movably mounted in the spotlight housing (not shown) so that the flashtube 1 may be placed in various positions with respect to the focus of the lens 8 to adjust the spread of the beams projected by the spotlight. Preferably, since the envelope 7 is not completely diffusing but only partially diffusing, the angle of the beam of light from the filament 5 incident on the envelope 7 is equal to or approximately equal to the angle which the spotlight lens 8 subtends or intercepts at the envelope 7. This has not been shown in the drawing which is schematic as far as concerns the positioning of the flashtube 2 with respect to the Fresnel lens 8 and the condensing lens 3. The structure of the flashtube 1, the incandescent lamp 2 and the other elements of the illuminating system of the spotlight are well known and my invention may be readily understood without a detailed description thereof.

What I claim as new and desire to secure by Letters Patent of the United States is:

1. In a spotlight for photography, in combination, a spotlight lens, a support, a flashtube mounted on said support and contiguous with the focus of said lens and having a convoluted tubular envelope shaped to form a hollow body, a light source capable of emitting light continuously spaced from said flashtube on said support and lens means on said support and so disposed between said source and said tube as to form normally an image of said source within the hollow body formed by the flashtube envelope, at least one turn of said envelope being in the path of the image-forming radiation so that the said radiation is thereby dispersed whereby the envelope is luminous at an intensity such that a beam of light having a spread and a candlepower distribution closely approaching that of the light beam produced when the flashtube is ignited and of sufficient intensity for focusing the spotlight is formed by the spotlight lens.

2. In a spotlight for photography, in combination, a spotlight lens, a support, a flashtube mounted on said support and contiguous with the focus of said lens and having a convoluted tubular envelope shaped to form a hollow body, a light source capable of emitting light continuously spaced from said flashtube on said support and lens means on said support and so disposed between said source and said tube as to form normally an image of said source within the hollow body formed by the flashtube envelope, at least one turn of said envelope being in the path of the image-forming radiation so that the said radiation is thereby dispersed whereby the envelope is luminous at an intensity such that a beam of light having a spread and a candlepower distribution closely approaching that of the light beam produced when the flashtube is ignited and of sufficient intensity for focusing the spotlight is formed by the spotlight lens, said support being movable with respect to said spotlight lens for focusing the spotlight on the subject.

3. In a spotlight for photography, in combination, a spotlight lens, a support, a flashtube mounted on said support and contiguous with the focus of said lens and having a tubular envelope with at least one turn, a light source capable of emitting light continuously spaced from said flashtube on said support and lens means on said support and so interposed between said source and said tube as to form normally an image of said source within said turn, said turn being in the path of the image-forming radiation so that the said radiation is thereby dispersed whereby the envelope is luminous at an intensity such that a beam of light having a spread and a candlepower distribution closely approaching that of the light beam produced when the flashtube is ignited and of sufficient intensity for focusing the spotlight is formed by the spotlight lens.

4. In a spotlight for photography, in combination, a spotlight lens, a support, a flashtube mounted on said support and contiguous with the focus of said lens and having a tubular envelope shaped in the form of a helix having spaced turns, an incandescent lamp spaced from said flashtube on said support and lens means on said support and so disposed between said lamp and said tube as to form normally an image of the incandescent filament at the axis of the helix, turns of said envelope being in the path of the image-forming radiation so that the said radiation is thereby dispersed whereby the envelope is luminous at an intensity such that a beam of light having a spread and a candlepower distribution closely approaching that of the light beam produced when the flashtube is ignited and of sufficient intensity for focusing the spotlight is formed by the spotlight lens.

5. In a spotlight for photography, in combination, a spotlight lens, a support, a flashtube mounted on said support and contiguous with the focus of said lens and having a tubular envelope shaped in the form of a helix having spaced turns, an incandescent lamp spaced from said flashtube on said support and lens means on said support and so disposed between said lamp and said tube as to form normally an image of the incandescent filament at the axis of the helix, turns of said envelope being in the path of the image-forming radiation so that the said radiation is thereby dispersed whereby the envelope is luminous at an intensity such that a beam of light having a spread and a candlepower distribution closely approaching that of the light beam produced when the flashtube is ignited and of sufficient intensity for focusing the spotlight is formed by the spotlight lens, said condensing lens and the spotlight lens subtending approximately equal angles at the envelope of the flashtube.

FRANK E. CARLSON.

REFERENCES CITED

The following references are of record in the file of this patent:

UNITED STATES PATENTS

| Number | Name | Date |
| --- | --- | --- |
| 1,907,295 | Hilliard | May 2, 1933 |
| 2,190,294 | Mili | Feb. 13, 1940 |
| 2,277,698 | Germeshausen | Mar. 31, 1942 |
| 2,319,207 | Clarkson | May 18, 1943 |